(12) United States Patent
Manternach et al.

(10) Patent No.: US 11,703,143 B2
(45) Date of Patent: Jul. 18, 2023

(54) METER VALVE

(71) Applicant: Mueller International, LLC, Atlanta, GA (US)

(72) Inventors: Eric Manternach, Decatur, IL (US); Timothy Bain Ervin, Apison, TN (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 16/845,848

(22) Filed: Apr. 10, 2020

(65) Prior Publication Data

US 2021/0317928 A1    Oct. 14, 2021

(51) Int. Cl.
     *F16K 5/02*          (2006.01)
     *F16K 35/06*        (2006.01)

(52) U.S. Cl.
     CPC ............ *F16K 35/06* (2013.01); *F16K 5/0242* (2013.01)

(58) Field of Classification Search
     CPC .... F16K 5/0207; F16K 5/0242; F16K 5/0292; F16K 27/062; F16K 35/06; Y10T 137/0508; Y10T 137/0519
     See application file for complete search history.

(56) References Cited

U.S. PATENT DOCUMENTS

| | | | | |
|---|---|---|---|---|
| 30,122 A | * | 9/1860 | Cleveland | F16K 5/025 251/181 |
| 1,787,401 A | * | 12/1930 | Spangler | F16K 35/06 137/385 |
| 3,462,119 A | * | 8/1969 | Smith | F16K 27/062 251/368 |
| 3,664,372 A | * | 5/1972 | Marshall | B01F 5/0403 137/552 |
| 3,779,513 A | * | 12/1973 | Levine | F16K 5/08 251/309 |
| 3,985,152 A | * | 10/1976 | Albanese | F16K 5/0492 137/360 |
| 4,483,366 A | * | 11/1984 | Labita | F16K 35/06 70/179 |
| 4,971,289 A | * | 11/1990 | Pietras | F16K 35/06 70/180 |
| 6,012,702 A | * | 1/2000 | Heimberger | F16K 5/163 137/240 |

(Continued)

FOREIGN PATENT DOCUMENTS

| | | | | |
|---|---|---|---|---|
| DE | 1149213 B | * | 5/1963 | ........... F16K 5/0292 |
| GB | 1067012 A | * | 4/1967 | ............. F16K 1/385 |

OTHER PUBLICATIONS

Mueller Co; Brochure for Meter Valves, published Dec. 2006, 24 pgs.

*Primary Examiner* — Hailey K. Do
(74) *Attorney, Agent, or Firm* — Taylor English Duma LLP

(57) ABSTRACT

Example aspects of a valve key, a meter valve, and a method for securing a valve key of a meter valve are disclosed. The valve key for a meter valve can comprise a key body defining an upper key body end and a lower key body end, a key head extending from the upper key body end, and a key stem extending from the lower key body end, wherein the key stem, key head, and key body define a monolithic structure, the key stem defining an extension portion and a securing portion, the securing portion defining a securing portion engagement surface.

29 Claims, 4 Drawing Sheets

(56) References Cited

U.S. PATENT DOCUMENTS

| | | | | |
|---|---|---|---|---|
| 2004/0004347 A1* | 1/2004 | Peel | ................ | B62D 1/184 |
| | | | | 280/775 |
| 2008/0128034 A1* | 6/2008 | Fahl | ................ | F16L 37/44 |
| | | | | 137/614.06 |
| 2011/0253925 A1* | 10/2011 | Guo | ................ | F16K 27/062 |
| | | | | 251/367 |

* cited by examiner

METER VALVE

TECHNICAL FIELD

This disclosure relates to gas meters. More specifically, this disclosure relates to a meter valve comprising a deformed valve key.

BACKGROUND

Meter valves (e.g., gas meter valves) can be selectively opened and closed to permit and prohibit, respectively, fluid flow therethrough. A valve key can be provided in the meter valve, which can be rotated to open and close the valve. The valve key can be secured to the valve to prevent removal of the valve key. As such, a locking assembly comprising a nut, pin, and complex washer can be provided to secure the valve key to the valve. A stem of the valve key can extend through an opening in the washer and threadably engage the nut, which can be tightened on the threaded stem. A blind hole can be drilled into the washer and stem, and the pin can be inserted into the hole. Furthermore, the nut can be staked. The locking assembly and the staking of the nut can aid in preventing the removal of the valve key from the valve; however, the locking assembly can be costly and can be time-consuming to assemble.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a valve key for a meter valve comprising a key body defining an upper key body end and a lower key body end; a key head extending from the upper key body end; and a key stem extending from the lower key body end, wherein the key stem, key head, and key body define a monolithic structure, the key stem defining an extension portion and a securing portion, the securing portion defining a securing portion engagement surface.

Also disclosed is a meter valve comprising a valve body defining a first side, a second side, an upper end, and a lower end, a lower valve opening formed through the lower end, the valve body further defining an interior passage extending from the first side to the second side; and a valve key extending across the interior passage from the upper end to the lower end, the valve key comprising a key stem, the key stem defining an extension portion and a securing portion, the extension portion extending through the lower valve opening; wherein the securing portion is configurable in an un-deformed configuration, wherein the valve key can be removed from the valve body, and a deformed configuration, wherein the securing portion defines a securing portion engagement surface configured to prohibit the valve key from being removed from the valve body.

A method for securing a valve key of a meter valve is also disclosed, the method comprising providing a valve body of the meter valve, the valve body defining an interior passage and a lower valve opening; extending a key body of a valve key across the interior passage; inserting a key stem of the valve key through the lower valve opening; and deforming a securing portion of the key stem to define a securing portion engagement surface.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
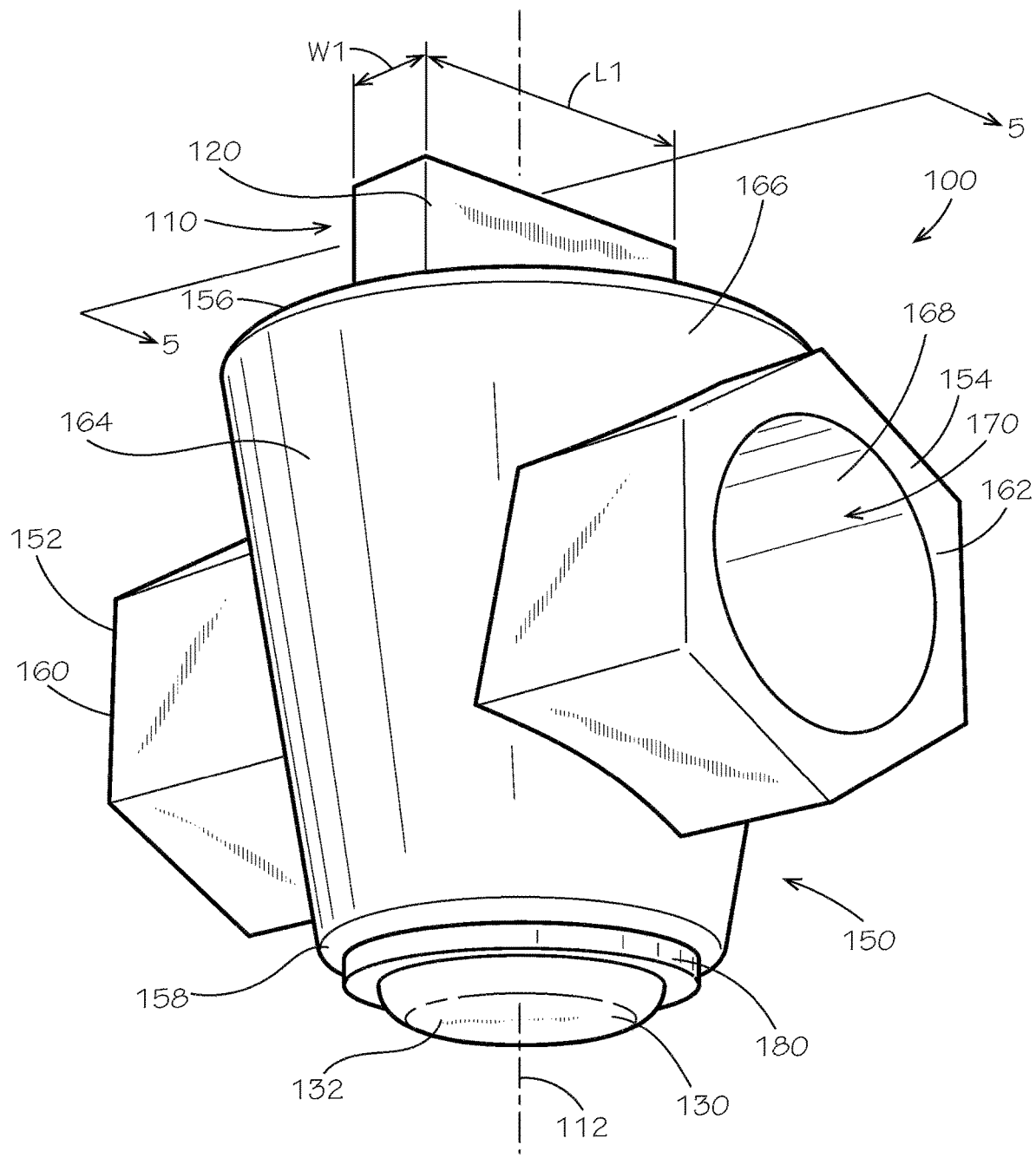
FIG. 1 is a bottom perspective view of a meter valve comprising a valve key, in accordance with one aspect of the present disclosure, wherein the key is in a deformed configuration

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a meter valve and associated methods, systems, devices, and various apparatus. Example aspects of the meter valve can comprise a valve key extending across an interior passage of the meter valve. A securing portion of the valve key can be deformed to prevent removal of the valve key from the meter valve. It would be understood by one of skill in the art that the meter valve is described in but a few exemplary embodiments among many. No particular terminology or description should be considered limiting on the disclosure or the scope of any claims issuing therefrom.

FIG. 1 is a bottom perspective view of a meter valve 100 comprising a valve key 110, in accordance with one aspect of the present disclosure. In example aspects, the meter valve 100 can be configured to control the flow of fluid (e.g., gas) through a service line (e.g., a gas line). As shown, according to example aspects, the meter valve 100 can comprise the valve key 110 and a valve body 150. The valve body 150 can generally define an inlet end 152, an outlet end 154 opposite the inlet end 152, an upper end 156, and a lower end 158 opposite the upper end 156, relative to the orientation shown. The valve body 150 can define a valve inlet 160 at the inlet end 152, a valve outlet 162 at the outlet end 154, and a valve middle region 164 therebetween. In example aspects, the valve body 150 can further define an outer valve body surface 166 and an inner valve body surface 168. The inner valve body surface 168 can define an interior valve passage 170 formed through the valve body 150, extending from the valve inlet 160 to the valve outlet 162. Gas, or another fluid, can be configured to flow through the interior valve passage 170 from the valve inlet 160 to the valve outlet 162, or in the reverse direction in some instances. In the present aspect, the interior valve passage 170 can be substantially cylindrical and can define a substantially circular cross-sectional shape, as shown; however, in other aspects, the interior valve passage 170 can define any other suitable shape. Moreover, in the present aspect, each of the valve inlet 160 and valve outer can define a substantially hexagonal cross-sectional shape, though in other aspects, the valve inlet 160 and valve outlet 162 can define any other suitable shape. According to example aspects, the valve body 150 can be formed from a metal material, such as, for example, iron. In other aspects, the valve body 150 can comprise any other suitable material, including, but not limited to, cast or ductile iron, bronze, brass, steel, aluminum, plastic, ceramics, and composites. Moreover, according to example aspects, the valve body 150 can be formed as a monolithic structure, wherein the valve body 150 can be formed from a single part.

In the present aspect, as shown, the valve key 110 can be configured to extend across the interior valve passage 170 at the valve middle region 164, from the upper end 156 of the valve body 150 to the lower end 158 of the valve body 150. Example aspects of the valve key 110 can define a key head 120, a key stem 130, and a key body 340 (shown in FIG. 3) therebetween, and can further define a key axis 112 extending from the key head 120 to the key stem 130. The key body 340 can be generally received within the interior valve passage 170, as shown, and can define a key passage 341 formed therethrough. Furthermore, the key head 120 can extend through an upper valve opening 356 (shown in FIG. 3) at the upper end 156 of the valve body 150, and the key stem 130 can extend through a lower valve opening 358 (shown in FIG. 3) at the lower end 158 of the valve body 150. In the present aspect, the key stem 130 can further extend through a washer 180 oriented adjacent to the lower end 158 of the valve body 150. According to example aspects, as shown, a securing portion 132 of the key stem 130 can be deformed to prevent removal of the valve key 110 from the meter valve 100, as described in further detail below with respect to FIGS. 4-6. Referring to the key head 120 of the valve key 110, in some aspects, the key head 120 can define a substantially rectangular cross section. The key head 120 of the valve key 110 can define a head length $L_1$ and key head width $W_1$, as shown, wherein the head length Li can be greater than the key head width $W_1$. In other aspects, the key head 120 can define any other suitable shape and dimensions. The key head 120 can be engaged by a tool (not shown), such as, for example, a wrench, and turned to rotate the valve key 110 within the interior valve passage 170 about the key axis 112. According to example aspects, rotating the valve key 110 can selectively open and close the meter valve 100. For example, the valve key 110 can be rotated between an open orientation (shown in FIG. 5), wherein fluid is permitted to flow through the interior valve passage 170 and the key passage 341 from the valve inlet 160 to the valve outlet 162, and a closed orientation, as shown, wherein fluid is prohibited from flowing through the interior valve passage 170. According to example aspects, the valve key 110 can be formed from a malleable material, such as, for example, a malleable metal material. Malleable metal materials can include steel, aluminum, brass, copper, and the like. However, in other aspects, the valve key 110 can be formed from any other suitable material known in the art, including, but not limited to, plastics, thermoplastics, polycarbonate, and acrylonitrile butadiene styrene (ABS). In example aspects, the malleability of the valve key 110 can allow the securing portion 132 of the valve stem 130 to be deformed under pressure, as described in further detail below. Furthermore, according to example aspects, the valve key 110 can be formed as a monolithic structure, wherein the valve key 110 can be formed from a single part.

Figure 2:
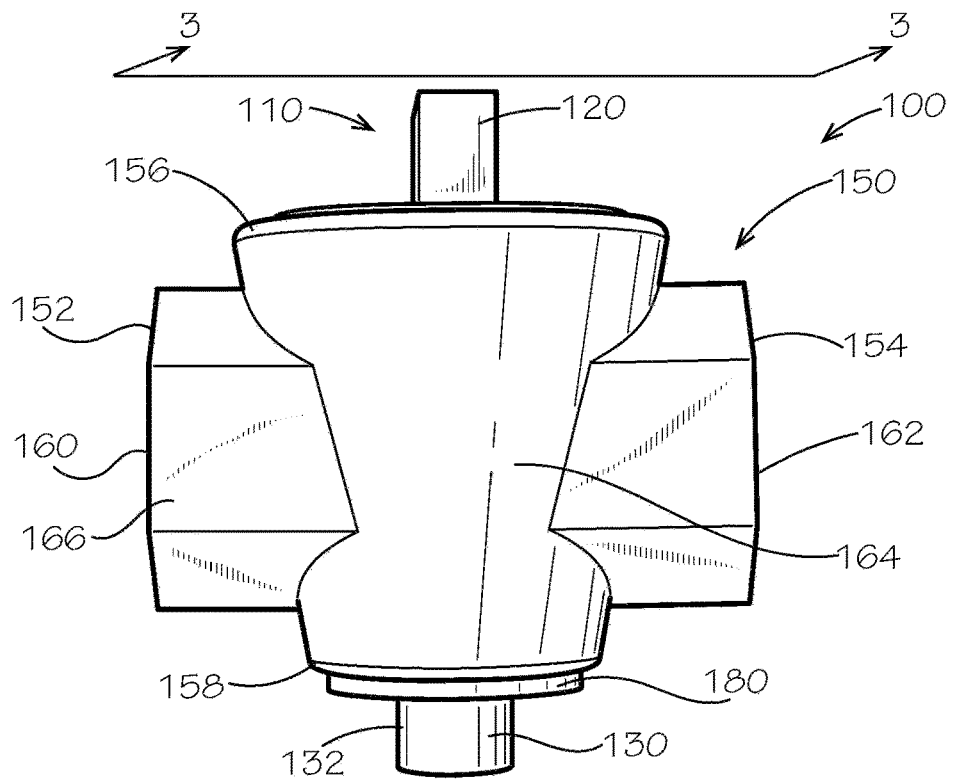
FIG. 2 is a front view of the meter valve of FIG. 1, wherein the valve key of FIG. 1 is in an un-deformed configuration.
Figure 3:
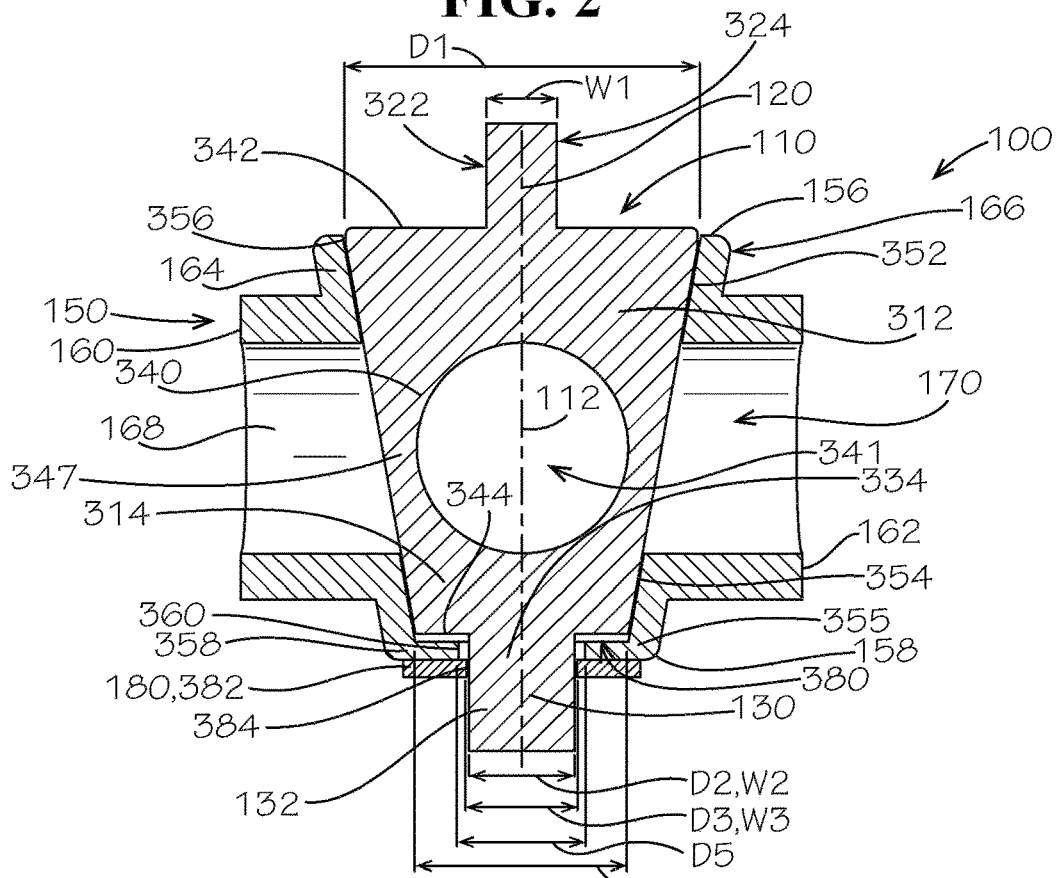
FIG. 3 is a cross-sectional view of the meter valve of FIG. 1, taken along line 3-3 in FIG. 2, wherein the valve key is in the un-deformed configuration, and wherein the valve key is in a closed orientation.

FIGS. 2 and 3 illustrate a front view and a front cross-sectional view of the meter valve 100, respectively. The views illustrate the key stem 130 of the valve key 110 prior to the deformation of the securing portion 132. Referring to FIG. 3, as shown, the upper valve opening 356 is formed at the upper end 156 of the valve body 150, and the lower valve opening 358 is formed at the lower end 158 of the valve body 150. Each of the upper and lower valve openings 356, 358 can define a substantially circular shape and can be concentric to the key axis 112. However, in other aspects, the upper and lower valve openings 356, 358 can define any other suitable shape. The key body 340 of the valve key 110 can extend across the interior valve passage 170 of the valve body 150 at the valve middle region 164, substantially from the upper valve opening 356 to the lower valve opening 358. As shown, the key body 340 can define an upper key body end 342 oriented at or proximate to the upper valve opening 356, and a lower key body end 344 oriented at or proximate to the lower valve opening 358. In the present aspect, the key body 340 can define a truncated cone shape, wherein a diameter of the key body 340 can taper from the upper key body end 342 to the lower key body end 344. In other aspects, the valve body 150 may taper in the opposite direction, may not taper at all, or may define any other suitable shape known in the art.

In some aspects, the inner valve body surface 168 of the valve body 150 can define an upper channel 352 extending from the interior valve passage 170 to the upper valve opening 356. The upper channel 352 can be configured to receive an upper portion 312 of the key body 340 and can be tapered to substantially match the taper of the key body 340 at the upper portion 312, as shown. Moreover, in some aspects, the inner valve body surface 168 can further define a lower channel 354 extending from the interior valve passage 170 to the lower valve opening 358. The lower channel 354 can be configured to receive a lower portion 314 of the key body 340 and can be tapered to substantially match the taper of the key body 340 at the lower portion 314, as shown. An intermediate portion 347 of the key body 340 can be received in the interior valve passage 170, and the key passage 341 can be formed through the intermediate portion 347. In the closed orientation, as shown, the valve key 110 can be rotated such that the key passage 341 formed therethrough can be oriented about perpendicular to the valve passage 170. In this orientation, the key passage 341 can be blocked to prohibit fluid from flowing through the valve passage 170 from the from the valve inlet 160 to the valve outlet 162. Furthermore, in the present aspect, an annular lower shelf 360 can extend radially inward from a distal end 355 of the lower channel 354 to the lower valve opening 358, and the lower valve opening 358 can define a lower valve opening diameter $D_5$ that can be smaller than a lower key body end diameter $D_6$ of the lower key body end 344. As such, the tapered shape of the key body 340 and the size of the lower valve opening 358 can prohibit the key body 340 from passing therethrough.

In some example aspects, the lower key body end 344 of the key body 340 can be configured to rest on the lower shelf 360. However, in other aspects, as shown, the lower key body end 344 of the key body 340 can be elevated above the lower shelf 360 by the engagement of the key body 340 with the inner valve body surface 168 of the valve body 150. As described above, the inner valve body surface 168 can define the tapered upper channel 352 and the tapered lower channel 354, which can be generally configured to match the taper of the key body 340. According to example aspects, to assemble the valve key 110 with the valve body 150, the key stem 130 and key body 340 can be inserted through the upper valve opening 356 of the valve body 150. The lower portion 314 of the key body 340 can engage the tapered inner valve body surface 168 at the lower channel 354, and the upper portion 312 of the key body 340 can engage the tapered inner valve body surface 168 at the upper channel 352, as shown. In example aspects, the valve key 110 can be pressed into the valve body 150 until a desired force of the valve key 110 on the valve body 150 is achieved. In some aspects, at the desired force, a gap 380 can be formed between the lower shelf 360 and the lower key body end 344 of the key body 340, as shown. Furthermore, at the desired force, the key stem 130 can be configured to extend through the lower valve opening 358. According to example aspects, the securing portion 132 of the key stem 130 can be deformed to secure the valve key 110 to valve body 150 and to maintain the key body 340 in position against the inner valve body surface 168 at the desired force, as described in further detail below.

As shown, the key head 120 can extend generally upward, relative to the orientation shown, from the upper key body end 342 of the key body 340, and the key stem 130 can extend generally downward, relative to the orientation shown, from the lower key body end 344 of the key body 340. As described above, the key head 120 can define a substantially rectangular cross-sectional shape in some aspects, and can be configured for engagement by a wrench (or other tool) to rotate the valve key 110 between the open orientation and closed orientation. For example, the key head 120 can define a first engagement face 322 and an opposite second engagement face 324 for engagement by the tool. Each of the first and second engagement faces 322, 324 can extend substantially parallel to the key axis 112. In other aspects, the key head 120 can define any other suitable shape. Furthermore, other aspects can define more or fewer engagement faces. As shown, in the present aspect, the key head width $W_1$ extending between the first and second engagement faces 322, 324 can be significantly smaller than an upper key body end diameter $D_1$ of the upper key body end 342 from which it extends. However, as described above, the head length $L_1$ (shown in FIG. 1) of the key head 120 can be greater than the key head width $W_1$ of the key head 120, and in some aspects, the head length $L_1$ can be equal to or nearly equal to the upper key body end diameter $D_1$ of the upper key body end 342. Moreover, as described above, the key body 340 can define a tapered cylindrical shape, such that the upper key body end diameter $D_1$ can be greater than the lower key body end diameter $D_6$.

Referring to the key stem 130, example aspects of the key stem 130 can be substantially cylindrical in shape. However, other aspects of the key stem 130 can define any other suitable shape. In the present aspect, the cylindrical key stem 130 can generally define an extension portion 334 extending from the lower key body end 344 and the securing portion 132 distal to the lower key body end 344. The key stem 130 can be configured to extend through the lower valve opening 358 and through a washer opening 384 of the washer 180, as shown. The washer 180 can be any suitable type of washer, including, but not limited to, a simple, flat washer 382 defining an overall disc shape. According to example aspects, the washer 180 can be positioned at the lower end 158 of the valve body 150 against the outer valve body surface 166, adjacent to the lower shelf 360, such that the washer opening 384 can be substantially aligned with the lower valve opening 358. As such, in the present aspect, the washer opening 384 can be substantially concentric to the key axis 112.

As shown, with the key body 340 received within the interior valve passage 170 and the key stem 130 extending through the lower valve opening 358 and washer opening 384, the extension portion 334 of the valve key 110 can be oriented within the lower valve opening 358 and washer opening 384, and the securing portion 132 of the valve key 110 can extend beyond the washer 180 and away from the valve body 150 in the axial direction. As shown, the extension portion 334 of the key stem 130 can define an extension portion diameter $D_2$. In the present aspect, a diameter of the securing portion 132 can be equal or about equal to the extension portion diameter $D_2$ prior to deformation of the securing portion 132, such that the extension portion diameter $D_2$ can generally be a diameter of the key stem 130. However, in other aspects, the diameter of the securing portion 132 can be different from the extension portion diameter $D_2$ of the extension portion 334 prior to deformation.

In example aspects, the washer opening 384 of the washer 180 can be sized such that minimal or no clearance is provided between the washer 180 and the extension portion 334 of the key stem 130. That is to say, a washer opening diameter $D_3$ of the washer opening 384 can be slightly larger than or about equal to the extension portion diameter $D_2$ of the extension portion 334 of the key stem 130. Or, more generally put, to encompass aspects wherein the washer opening 384 and/or extension portion 334 may not define a circular cross section, a washer opening width $W_3$ of the washer opening 384 can be slightly larger than or about equal to an extension portion width $W_2$ of the extension portion 334 of the key stem 130. Similarly, the lower valve opening diameter $D_5$ can be about equal to or slightly larger than the extension portion diameter $D_2$ or width $W_2$, such that the extension portion 334 can be received through the lower valve opening 358 with minimal clearance. As shown, the lower valve opening diameter $D_5$ can be greater than the washer opening diameter $D_3$ of the washer 180 in some aspects, or vice versa, or the diameters $D_5$ and $D_3$ can be about equal. Furthermore, as shown, the extension portion diameter $D_2$ (or width $W_2$) can be less than the lower key body end diameter $D_6$ of the lower key body end 344.

Figure 4:
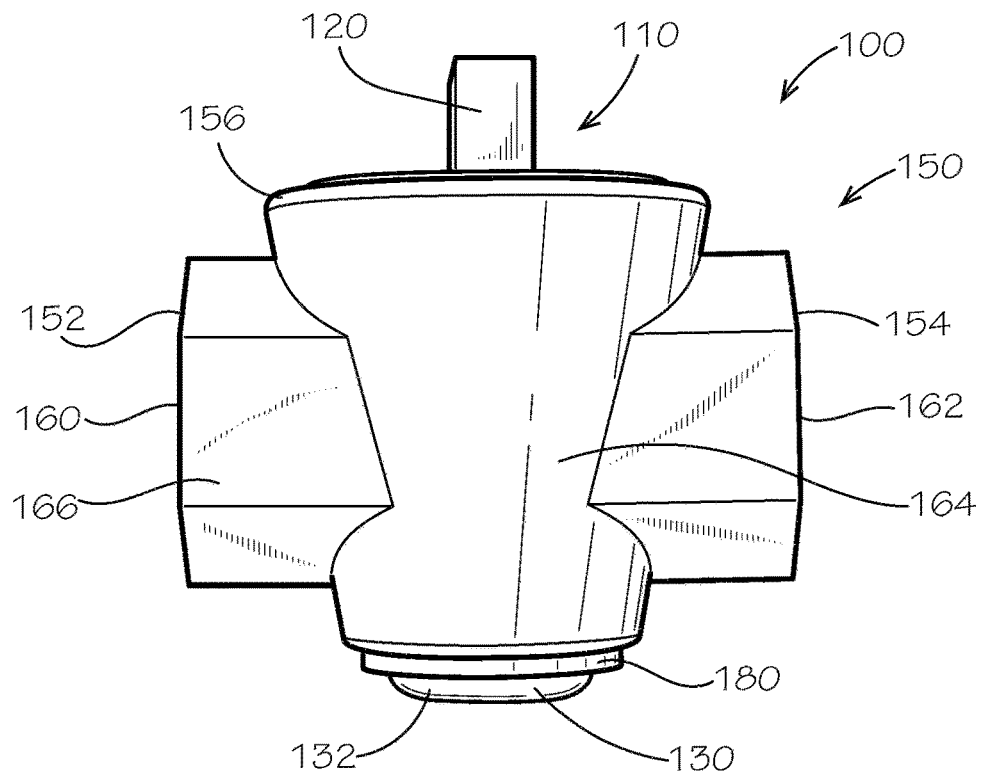
FIG. 4 is a front view of the meter valve of FIG. 1, wherein the key of FIG. 1 is in the deformed configuration.
Figure 5:
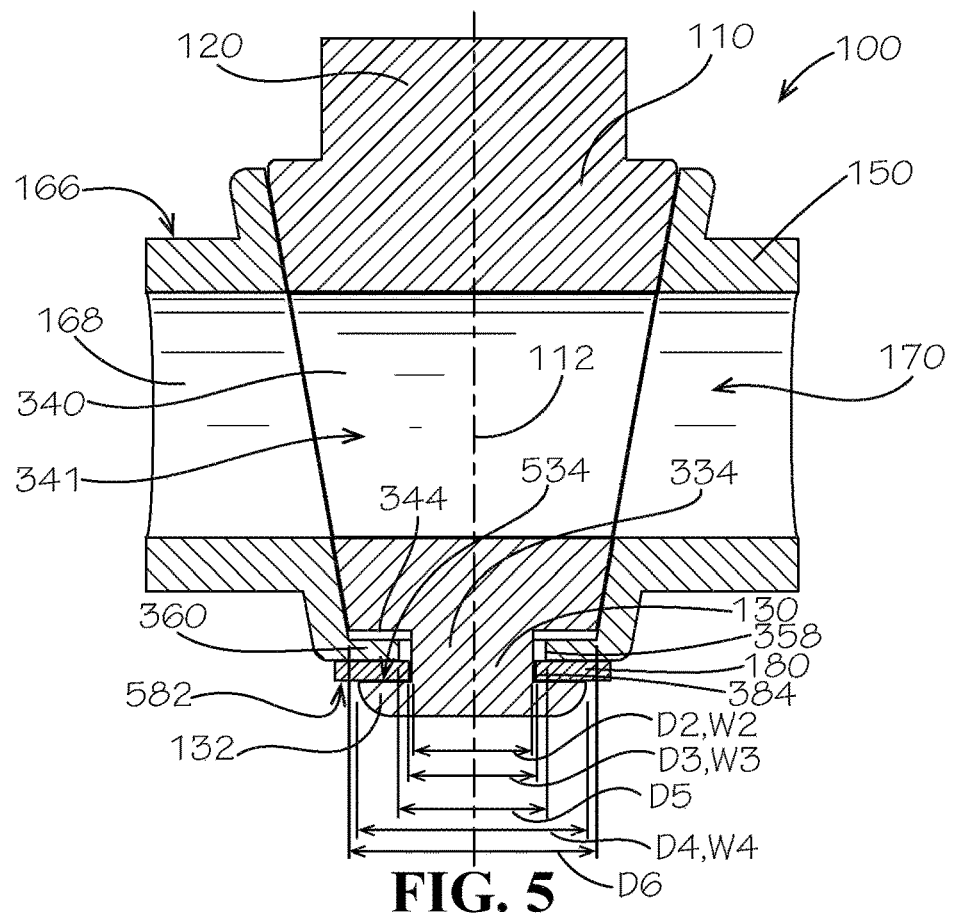
FIG. 5 is a cross-sectional view of the meter valve of FIG. 1, taken along line 5-5 in FIG. 1, wherein the valve key is in the deformed configuration, and wherein the valve key is in an open orientation.

In order to secure the valve key 110 to the valve body 150 and to prevent removal of the valve key 110 therefrom, the securing portion 132 of the key stem 130 can be deformed. FIGS. 4 and 5 illustrate front and front cross-sectional views of the meter valve 100, respectively, wherein the securing portion 132 of the key stem 130 has been deformed. Referring to FIG. 5, as shown, the key valve 110 can be oriented in the open orientation. The key valve 110 can be moved from the closed orientation (shown in FIGS. 3 and 6) to the open orientation by engaging the key head 120 with a tool and turning the tool to rotate the valve key 110 about the key axis 112. In the open orientation, the key passage 341 can be substantially aligned with the valve passage 170 of the valve body 150 to allow fluid to flow through the meter valve 100.

As also shown in FIG. 5, the securing portion 132 can be deformed to define a securing portion engagement surface 534 that can engage a lower washer surface 582 of the washer 180, such that the lower shelf 360 and washer 180 are generally sandwiched between the lower key body end 344 and the deformed securing portion 132. In the present aspect, the securing portion 132 can be deformed to define a substantially flattened circular shape overall. However, in other aspects, the securing portion 132 can be deformed to define any other suitable shape, such as, for example, a substantially oval shape, triangular shape, rectangular shape, or any other suitable shape, including irregular shapes. Moreover, the securing portion engagement surface 534 can define a substantially annular and planar surface in example aspects. When deformed, the securing portion 132 can define a securing portion diameter $D_4$ and/or a securing portion width $W_4$ that can be greater than the extension portion diameter $D_2$ and/or extension portion 334 width $W_2$ of the extension portion 334, as shown. Moreover, the securing portion diameter $D_4$ and/or securing portion width $W_4$ of the deformed securing portion 132 can be greater than the washer opening diameter $D_3$ and/or washer opening width $W_3$ of the washer opening 384, and as such, the securing portion 132 can be prevented from passing through the washer opening 384. Additionally, in some aspects, the securing portion diameter $D_4$ and/or securing portion width $W_4$ of the deformed securing potion can also be greater than the lower valve opening diameter $D_5$ of the lower valve opening 358.

Furthermore, as described above, the lower key body end diameter $D_6$ can be greater than the lower valve opening diameter $D_5$ of the lower valve opening 358. As such, with the securing portion 132 deformed, the size of the securing portion 132 can prevent the securing portion 132 from passing through the washer opening 384, and the size of the lower key body end 344 can prevent the key body 340 from passing through lower valve opening 358. Thus, the valve key 110 can be prevented from removal from the valve body 150. Additionally, the securing portion 132 can be deformed as the key body 340 of the valve key 110 is pressed against the inner valve body surface 168 at the desired force, as described above, and the engagement of the securing portion engagement surface 534 of the deformed securing portion 132 with the lower washer surface 582 of the washer 180 can aid in retaining the key body 340 in position against the inner valve body surface 168 of the valve body 150 at the desired force. In other aspects, the meter valve 100 may not comprise the washer 180, and the securing portion 132 can be deformed against the outer valve body surface 166 at the lower shelf 360. In such an aspect, the size of the securing portion 132 can prevent the securing portion 132 from passing through the lower valve opening 358.

According to example aspects, the securing portion 132 of the key stem 130 can be deformed by any suitable method of deformation. For example, in one aspect, the securing portion 132 can be deformed by the process of orbital forming. Orbital forming is typically a cold forming process and can comprise applying a pressure in an orbital motion against the securing portion 132 of the key stem 130. In particular, a tool, such as a peen tool, can be held at a fixed angle and can be moved in an orbital pattern while pressing against the securing portion 132 to deform the material of the securing portion 132 into the substantially flattened circular shape shown. In other aspects, the securing portion 132 can be deformed by swaging, crimping, peening, cold forming or cold heading, which may use progressive dies in some aspects, warm forming, hot forming, or any other suitable deformation method known in the art.

Figure 6:
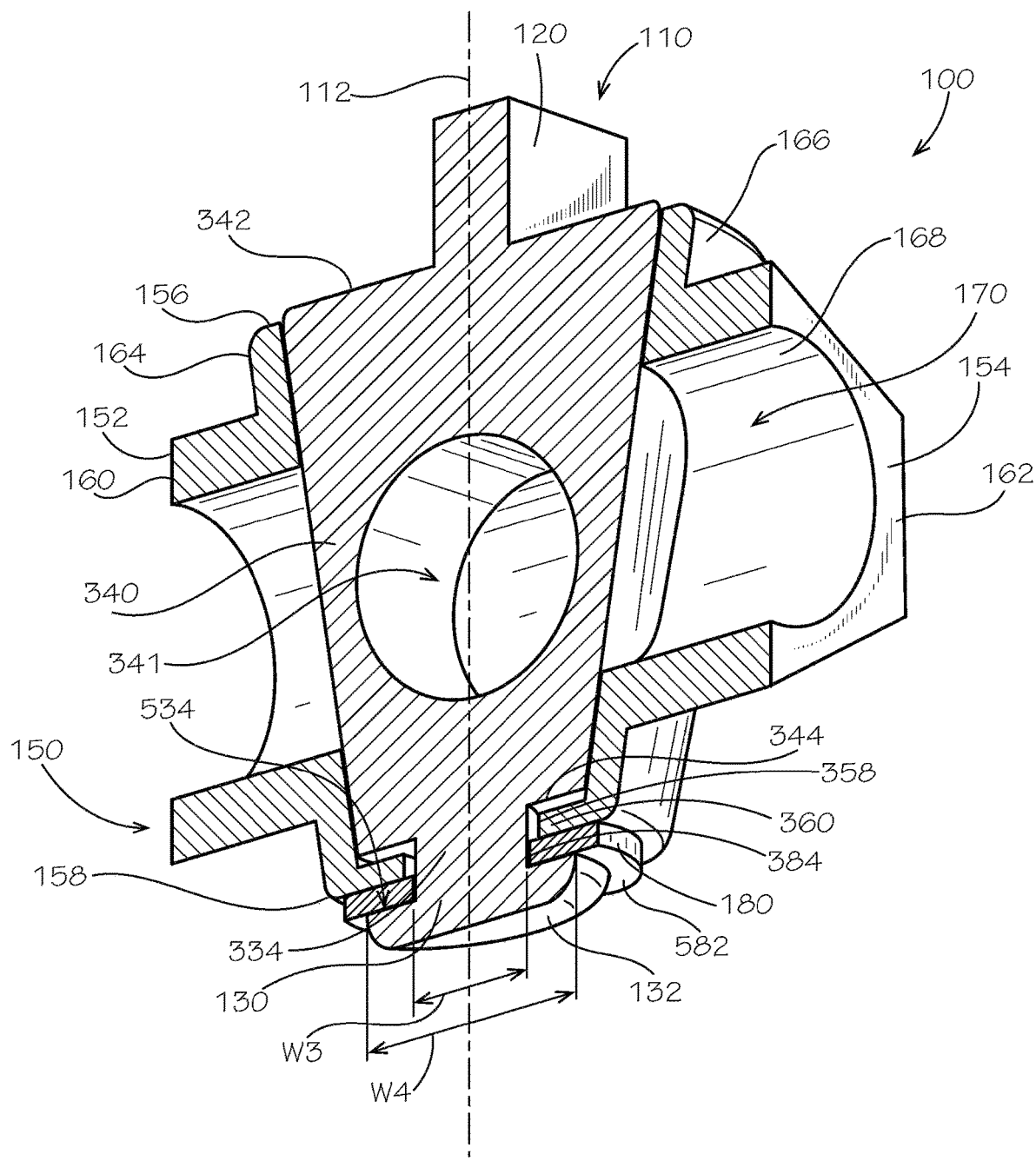
FIG. 6 is a cross-sectional perspective view of the meter valve of FIG. 1, taken along line 5-5 in FIG. 1, wherein the valve key is in the deformed configuration and the closed orientation.

FIG. 6 illustrates a cross-sectional perspective view of the meter valve 100, wherein the securing portion 132 of the key stem 130 is deformed to secure the valve key 110 to the valve body 150. According to example aspects, a method for securing the valve key 110 to the valve body 150 of the meter valve 100 can comprise providing the valve body 150, wherein the valve body 150 can define the interior valve passage 170 and the lower valve opening 358, and extending the key body 340 of the valve key 110 across the interior valve passage 170. The method can further comprise inserting the key stem 130 of the valve key 110 through the lower valve opening 358 and through the washer opening 384 of the washer 180. Finally, the method can comprise deforming the securing portion 132 of the key stem 130, wherein the deformed securing portion 132 defines the securing portion width $W_4$ (or securing portion diameter $D_4$) that can be greater than the washer opening width $W_3$ (or washer opening diameter $D_3$) of the washer 180. In some aspects, the method can further comprise pressing the key body 340 against the inner valve body surface 168 of the valve body 150 at a desired force concurrent with deforming the securing portion 132, so that the key body 340 can be secured in position against the inner valve body surface 168 at the desired force. In some aspects of the method, deforming the securing portion 132 of the key stem 130 can comprise deforming the securing portion 132 by an orbital forming process. Furthermore, in some aspects, deforming the securing portion 132 by the orbital forming process can comprise applying pressure with a tool in an orbital motion against the securing portion 132 of the key stem 130.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A valve key for a meter valve comprising:
    a key body defining an upper key body end and a lower key body end;
    a key head extending from the upper key body end; and
    a key stem extending from the lower key body end, wherein the key stem, key head, and key body define a monolithic structure, the key stem defining an extension portion and a securing portion, the extension portion configured to extend through a lower valve opening of the meter valve, the securing portion defining a securing portion engagement surface;
    wherein the securing portion is configurable in an undeformed configuration and a deformed configuration, a securing portion width of the securing portion is greater in the deformed configuration than in the undeformed configuration, and the securing portion width in the deformed configuration is configured to be greater than a width of the lower valve opening; and
    wherein the securing portion engagement surface defines an annular, planar surface, and in the deformed configuration, the securing portion defines a substantially planar outer surface opposite the securing portion engagement surface and distal to the extension portion.

2. The valve key of claim 1, wherein the valve key defines a key axis, and the key head and key stem extend from the key body in an axial direction.

3. The valve key of claim 1, wherein the extension portion extends from the lower key body end and the securing portion is distal to the lower key body end.

4. The valve key of claim 1, wherein the key body defines a tapered cylindrical shape, and a diameter of the key body tapers from the upper key body end to the lower key body end.

5. The valve key of claim 1, wherein:
    each of the extension portion and securing portion define a substantially circular cross section; and
    the securing portion defines a securing portion diameter that is greater than an extension portion diameter of the extension portion.

6. The valve key of claim 1, wherein a lower key body end diameter of the lower key body end is greater than an extension portion width of the extension portion.

7. The valve key of claim 1, wherein the securing portion width is greater than an extension portion width of the extension portion in the deformed configuration.

8. The valve key of claim 1, wherein the securing portion is deformed from a substantially cylindrical shape in the un-deformed configuration to a substantially disc shape in the deformed configuration.

9. The valve key of claim 1, wherein, in the deformed configuration, a diameter of the substantially planar securing portion outer surface is less than the diameter of the securing portion engagement surface.

10. The valve key of claim 1, wherein a length of the key head is greater than a width of the key head.

11. The valve key of claim 10, wherein the length of the key head is less than a length of the substantially planar upper surface of the key body.

12. The valve key of claim 1, wherein the key head defines a substantially rectangular cross section.

13. The valve key of claim 12, wherein:
the upper key body end defines a substantially planar upper surface; and
the key head extends from the substantially planar upper surface.

14. A meter valve comprising:
a valve body defining a first side, a second side, an upper end, and a lower end, a lower shelf formed at the lower end, a lower valve opening formed through the lower shelf, the valve body further defining an interior valve passage extending from the first side to the second side; and
a valve key comprising a key body extending longitudinally across the interior valve passage, the key body defining a lower key body end, the valve key further comprising a key stem extending from the lower key body end of the key body, the key stem defining an extension portion and a securing portion, the extension portion extending through the lower valve opening;
wherein the securing portion is configurable in an un-deformed configuration, wherein the securing portion defines a first width and the valve key can be removed from the valve body, and a deformed configuration, wherein the securing portion is deformed to define a second width that is greater than the first width to prohibit the valve key from being removed from the valve body.

15. The meter valve of claim 14, wherein:
the valve body defines a valve inlet at the first side and a valve outlet at the second side;
the interior valve passage extends from the valve inlet to the valve outlet; and
the valve key is movable between an open orientation, wherein fluid is permitted to flow through the interior valve passage from the valve inlet to the valve outlet, and a closed orientation, wherein fluid is prohibited from flowing through the interior valve passage.

16. The meter valve of claim 12 wherein:
a key body of the valve key defines an upper key body end and a lower key body end;
the key stem extends from the lower key body end;
the lower key body end is oriented proximate to the lower valve opening; and
the lower key body end defines a lower key body end diameter that is greater than a lower valve opening diameter of the lower valve opening to prohibit the key body from passing through the lower valve opening.

17. The meter valve of claim 14, wherein:
the valve key defines a key body, a key head, and the key stem;
the key body defines a substantially planar upper surface;
the key head extends from the substantially planar upper surface and defines a substantially rectangular cross section.

18. The valve key of the claim 14, wherein the lower key body end is elevated above the lower shelf to define a longitudinal gap therebetween.

19. The valve key of claim 18, wherein:
the valve key further comprises a substantially planar washer positioned between the valve body and the securing portion, the washer defining an upper washer surface and a lower washer surface, wherein the upper washer surface lies substantially flat against the lower end of the valve body; and
in the deformed configuration, the securing portion is deformed to define a securing portion engagement surface configured to engage the lower washer surface to prohibit the valve key from being removed from the valve body.

20. The meter valve of claim 19, the washer defining a washer opening aligned with the lower valve opening, the washer opening defining a washer opening width, wherein the first width of the securing portion is less than the washer opening width, and wherein the second width of the securing portion is greater than the washer opening width.

21. The meter valve of claim 14, wherein:
the valve body defines an inner valve body surface;
a key body of the valve key engages the inner valve body surface at a desired force; and
the securing portion retains the key body in position against the inner valve body surface at the desired force.

22. The meter valve of claim 21, wherein:
the inner valve body surface defines the interior valve passage, an upper channel, and a lower channel;
an upper portion of the key body is received in the upper channel;
a lower portion of the key body is received in the lower channel; and
an intermediate portion of the key body is received in the interior valve passage;
a key passage is formed through the intermediate portion.

23. The meter valve of claim 22, wherein:
the key body defines an upper key body end and a lower key body end;
the key body tapers from the upper key body end to the lower key body end;
the upper channel is tapered to match the taper of the key body at the upper portion; and
the lower channel is tapered to match the taper of the key body at the lower portion.

24. The meter valve of claim 22, wherein the valve body further comprises an annular lower shelf extending radially inward from a distal end of the lower channel to the lower valve opening.

25. A method for securing a valve key of a meter valve comprising:
providing a valve body of the meter valve, the valve body defining an interior valve passage, a lower end, and a lower valve opening formed at the lower end, the valve body comprising a lower shelf formed at the lower end, the lower valve opening extending through the lower shelf;
inserting a key body of a valve key into the interior valve passage, the key body defining a lower key body end;
inserting a key stem of the valve key through the lower valve opening, the key stem extending from the lower key body end; and deforming a securing portion of the key stem to define a securing portion engagement surface, wherein deforming the securing portion of the key stem increases a width of the securing portion from a first width to a second width.

26. The method of claim 25, further comprising pressing the key body against an inner valve body surface of the valve body at a desired force concurrent with deforming the securing portion.

27. The method of claim 25, wherein:
  deforming the securing portion of the key stem comprises deforming the securing portion by an orbital forming process; and
  deforming the securing portion by an orbital forming process comprises applying pressure with a tool in an orbital motion against the securing portion of the key stem.

28. The method of claim 18, wherein the lower key body end is elevated above the lower shelf to define a longitudinal gap therebetween.

29. The method of claim 28, further comprising mounting a substantially planar washer on the key stem, wherein the washer defines an upper washer surface and a lower washer surface, the upper washer surface lies substantially flat against the lower end of the valve body, and the securing portion engagement surface engages the lower washer surface.

* * * * *